United States Patent [19]

Häggström

[11] Patent Number: 4,854,179
[45] Date of Patent: Aug. 8, 1989

[54] COAXIAL LOAD CELL
[75] Inventor: Rolf P. Häggström, East Walpole, Mass.
[73] Assignee: BLH Electronics, Inc., Canton, Mass.
[21] Appl. No.: 104,797
[22] Filed: Oct. 2, 1987
[51] Int. Cl.$^4$ ............................................. G01L 1/22
[52] U.S. Cl. ............................................. 73/862.66
[58] Field of Search ............ 73/862.66, 862.65, 862.04
[56] References Cited
U.S. PATENT DOCUMENTS

| 4,453,422 | 6/1984 | Yorgiadis | 73/862.66 |
| 4,573,362 | 3/1986 | Amlani | 73/862.04 |

FOREIGN PATENT DOCUMENTS 2409372  9/1975  Fed. Rep. of Germany ... 73/862.65

Primary Examiner—Charles A. Ruehl

[57] ABSTRACT

An electrical strain-gaged load cell whose central and peripheral load-transmitting portions are coaxial with one another about an axis of applied loading includes intermediate interconnections formed by several planar-surfaced elongated shear-sensing beam elements whose opposite ends are integral with the coaxial portions and whose directions of elongation are essentially those of chords across the substantially annular spacing between the coaxial portions. Even in cells of small size, the relatively large chordal lengths of the beams, and the relatively sizable access spaces which may be accommodated alongside them, allow for convenient and facile installation of strain gages which will electrically characterize shear strains induced in the beams as they share transmission of the applied loading. Relatively massive end connections by which the beams connect with the coaxial portions are cantilevered radially inwardly and outwardly of the coaxial portions, angularly between the sites of the beams, to provide sturdy supports which will avoid undesirable end effects and, at the same time, will enable overall size and bulk of the cell to be minimized in designs rated for various capacities.

11 Claims, 1 Drawing Sheet

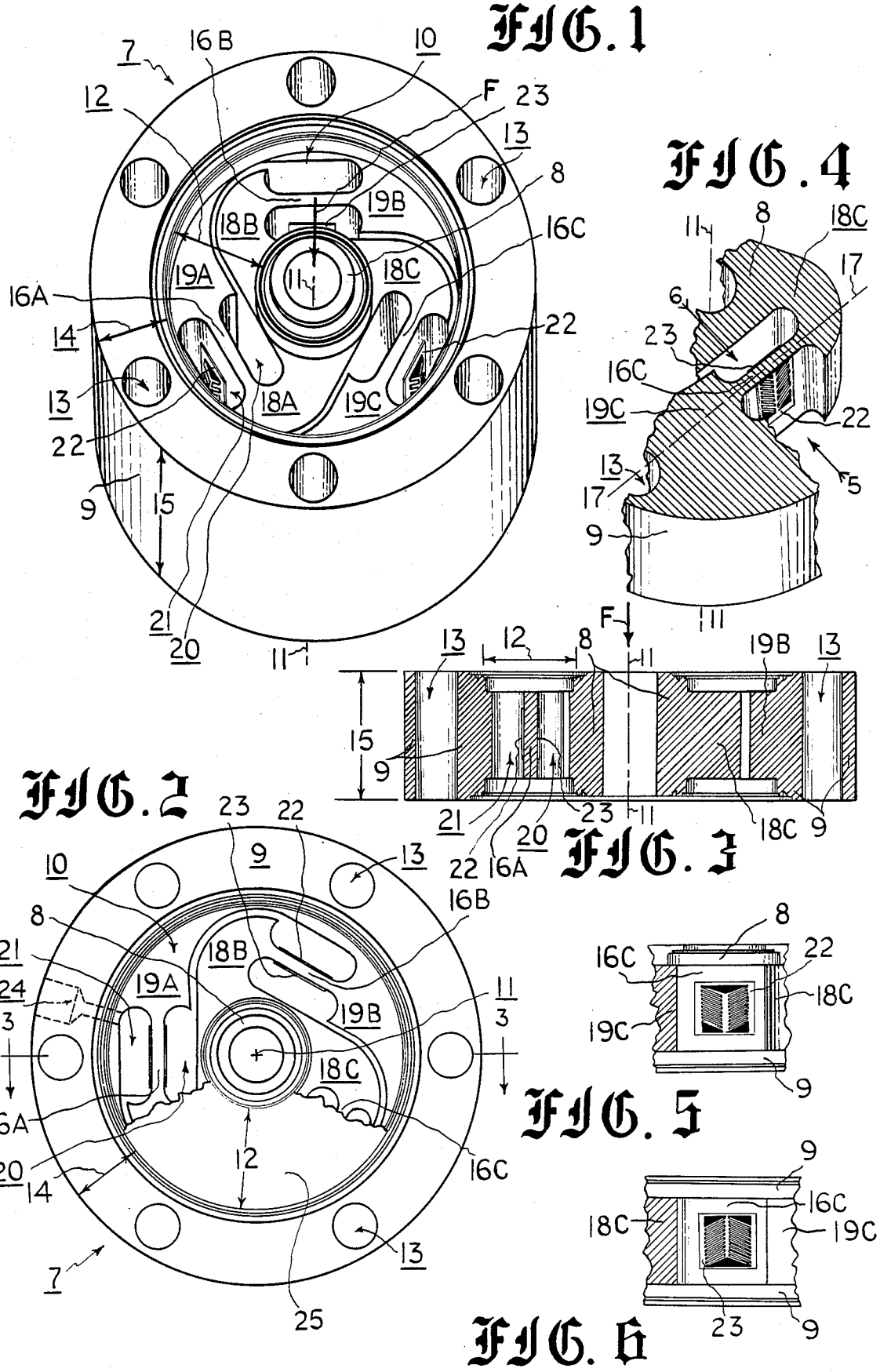

COAXIAL LOAD CELL

BACKGROUND OF THE INVENTION

The present invention relates to improved strain-gage transducers having relatively small bulk and exhibiting advantageously linear performance characteristics, due principally to unique load-transmitting interconnections between their load-receiving and load-supporting parts, and, in one particular aspect, to readily-gaged downsized coaxial-type load cells wherein linearity and precision are promoted by mechanically coupling concentric inner and outer structural elements via several relatively elongated shear-sensing beams disposed along angularly-spaced chords of an annular region between those elements, and by providing rugged integral end connections for the beams which extend inwardly and outwardly at angular positions between the beams.

Transducers in which strain gages respond to and electrically characterize elastic deformations of members experiencing loading have long been known in a variety of forms and sizes, for purposes of characterizing such phenomena as force, torque, weight and pressure. To promote convenience of usage in the trade by customers, some such transducers are fashioned as sealed cells which may be bodily introduced into operating environments where they will function as part of a load-carrying structure at the same time that they perform needed measurements; tanks, bins, rolling-mill equipment and the like commonly incorporate such cells, and it is routinely required that they occupy as little space as possible while nevertheless being capable of withstanding very high peak loads and of performing precision measurements within ranges of special interest.

One form of cell which has earned a deservedly outstanding reputation in satisfying such rigorous requirements has been of a generally concentric or coaxial configuration involving a central load-receiving portion and an outer ring-like portion, the two being connected together at several equally-spaced angular positions by integral short radial "spokes". Such radial interconnections have been conveniently formed by material left in place between adjacent drilled holes, and load-related shear strains developed in those radially-extending interconnections have been characterized electrically with the aid of strain gages bonded at appropriate sites (U.S. Pat. Nos. 3,037,178 and 3,958,456). Unfortunately, those surfaces along which shear strain would best be sensed by the gages have curvatures of the drilled holes, and their most critical orientations are along the thinnest portions between adjacent curved surfaces and lie within the holes. Installation of the gages tends to be highly exacting and troublesome, especially when the hole sizes are small. Although it is generally desirable to minimize the overall heights and diameters of such cells, for given capacities, reductions in size tend to be at the expense of impaired performance because of adverse influences of twisting or other mechanical distortions of less rigid central and outer portions and because of "end effects" associated with weaker end connections for the radial spokes. In the latter connection, there is of course less room for sturdy end connections of the radial spokes as the cell diameter is reduced, and the short radial beams can then witness strains which are in varying rather than fixed patterns; such variations in turn affect the strain-gage outputs and tend to cause cell outputs with loading to be at least non-linear, if not inaccurate.

In accordance with improvements taught here, the placements of gages in coxial load cells and the like is rendered less critical, and ample access for their convenient installation is provided, even though overall cell size is reduced. Moreover, the strain-sensitive beam elements which interconnect inner and outer load-transmitting portions in such devices are flat-sided and elongated and are not oriented radially, and relatively massive end connections which do not deform readily are advantageously accommodated in spaces between the beam elements.

SUMMARY OF THE INVENTION

In a preferred expression of the present invention, a coaxial load cell having a one-piece monolithic steel load-transmitting structure includes a generally-conventional center load-receiving portion and encircling outer load-supporting portion radially spaced from it about a longitudinal axis along which loads are applied to the center portion; however, each of several interconnections by which those coaxial portions are bridged and united is in the special form of a shear-sensing beam having a direction of elongation along a chord of a circle about and normal to the loading axis, and each such beam is connected at one end to the center portion by a sturdy and relatively massive tapering end section and, at its opposite end, to the outer portion by another sturdy and relatively massive tapering end section. Shear-characterizing electrical strain gages, such as bonded electrical-resistance foil gages, are applied to the beams along selected surfaces of their first sides, which sides extend in one direction substantially parallel with the longitudinal axis and in a transverse direction substantially parallel with the associated chords; sufficient radial space is available and left alongside the beams to allow the gages to be installed with ease, and their placements near mid-positions along the flat sides of the beams is relatively non-critical inasmuch as shear-strain patterns in the beams tend to be relatively uniform due to the beam elongations and flatness and to the stabilizing effects of the sturdy end sections nested into the cell construction.

Accordingly, it is one of the objects of this invention to provide novel and improved coaxial load cell constructions which allow for their economical and uncomplicated manufacture in relatively low-profile small-bulk form while preserving accuracy and linearity in performance and ruggedness and reliability in service.

A further object is to provide unique and advantageous strain-gage transducer apparatus in which load-transmitting members are interconnected by way of distincitively-oriented elongated shear-sensing beams in unusual compactly-nested arrangements with end supports which minimize disturbing end effects.

BRIEF DESCRIPTION OF THE DRAWINGS

Although those aspects of this invention which are considered to be novel are expressed in the appended claims, further details as to preferred practices and as to further objects and features thereof may be most readily comprehended through reference to the following detailed description when taken in connection with the accompanying drawings, wherein:

FIG. 1 is a view in perspective of principal components of a preferred embodiment of an improved coaxial load cell expressing the present teachings;

FIG. 2 provides a top plan view of the same cell, together with a portion of its upper annular sealing diaphragm;

FIG. 3 is a transverse cross-section of the same cell, taken along the diameter of section 3—3 in FIG. 2;

FIG. 4 illustrates, in a partially cross-sectioned perspective, a fragment of the same cell featuring one of the three gaged shear-beam elements which interconnect inner and outer coaxial load-transmitting portions of the cell;

FIG. 5 is a view showing the same cell's gaged shear-beam element of FIG. 4, taken in the direction of arrow 5 in FIG. 4; and FIG. 6 depicts the cell's same gaged shear-beam element, viewed in the direction of arrow 6 in FIG. 4.

DETAILED DESCRIPTION OF THE PREFERRED EMBODIMENTS

Having reference to the drawings, wherein like reference characters designate identical or corresponding elements or units throughout the several views, and more particularly to FIGS. 1 and 2 thereof, an improved coaxial load cell 7 is shown to incorporate a central inner load-receiving portion 8 and an encircling outer peripheral load-supporting portion 9, both of which are integral with intermediate interconnecting structure 10 in an essentially monolithic load-transmitting assembly fashioned of elastically deformable material (such as steel). Portions 8 and 9 are coaxial about a central loading axis 11—11, and are both generally cylindrical and accommodate their intermediate interconnecting structure 10 within an annular region having but a relatively short radial dimension 12 (FIGS. 1, 2 and 3). Load-receiving central portion 8 may be capped by a rounded load-receiving button (not shown), to accept downward compressive forces F along axis 11—11, and/or may be internally threaded to mate with a bolt-like shaft through which forces in tension may be applied to the cell. The load-supporting peripheral cylindrical portion 9 must exhibit strong resistance to toroidal twisting actions which tend to be created by loading of center portion 8, and it is therefore made quite massive and is designed to be securely bolted down to a very flat and rigid support (not shown) by way of its bolt holes 13.

If the overall radial dimensions of such a cell can be kept relatively small, by avoiding need for a large-radius intermediate annular region 12 between the inner and outer portions 8 and 9, then the generally-massive cylindrical peripheral portion 9 can in turn be made advantageously smaller not only in its radial-thickness dimension 14 (FIGS. 1 and 2) but also in its height 15 (FIGS. 1 and 2), while preserving the needed structural strength and resistance to toroidal twisting. That is in fact part of what is enabled by replacing the usual earlier-known radial "spokes" of such a cell with a special array of beams and end supports like that designated by numeral 10. In that particular array, there are three separate shear-sensing beams, 16A, 16B, and 16C, each of which is flatsided and elongated in a transverse direction 17—17(FIG. 4) which is substantially normal both to the loading axis 11-11 and to a radius from that axis; in terms of the substantially annular region between inner and outer portions 8 and 9, such elongation is essentially along a chord within that annulus, the three chordal locations preferably being equally spaced angularly about the loading axis 11—11. Supports for the two ends of each of the beams are furnished by a group of special integral end connections 18A, 18B and 18C which are tooth-like projections outwardly from the cell's load-receiving center portion 8, and by a group of complementary-shaped tooth-like projections 19A, 19B and 19C extending inwardly from the cell's outer load-supporting portion 9. Adjoining outwardly and inwardly-projections are radially separated from one another by only small spaces, and they overlap angularly, as shown in FIGS. 1 and 2, in a compact nested relationship occupying most of the annular space to be found between the beams. With that arrangement, the end connections are of sufficient size to exhibit much strength, thereby insuring that they will not readily deform under loading and allow unwanted changes in stress patterns within the beams they support. In general, the bases of these tooth-like projections are made as broad as possible, with their junctures with the beams being tapered down to promote uniformity of stresses within the beams under loading conditions. As shown, such tapering is conveniently established by material removals of generally-cylindrical shaping, although it may usefully be shaped differently.

Importantly, the aforesaid chordal dispositions of the beams, with end supports angularly between them, not only affords room, even in a relatively small cell, for the beams to be made flat and elongated as described, but also allows for provision of radial spaces on both sides of the beams which are ample enough to facilitate the insertions and adjustments and bonding of associated strain gages. As has already been said, when such beams are made flat, rather than curved or otherwise irregular, and when they are relatively long and their end supports are very sturdy, gage positioning advantageously becomes less critical. But, in addition, when there is ample lateral space for such gages to be installed easily, precision manufacture is greatly facilitated. The longitudinally-extending lateral inner and outer spaces 20 and 21, respectively, are of that character and promote those beneficial results. Although both spaces are of about the same radial span in the illustrated cell, they need not be, particularly where it is chosen to apply gages only to one side of the beams; there is best advantage when the beams are positioned as far out radially as possible, because adverse effects of off-center loading are then more offset, and that favors the selection of the greater lateral spacing inwardly of the beams.

The geometry of cell 7 may also be considered in terms of the circumferential distributions of the radially inwardly-and outwardly-projecting end connections for the beams, within the annular region 10 between the outer ring 9 and center portion 8. The preferred interfitting of parts involves radially inwardly-projecting end connections 19A, 19B and 19C whose rigid integral connections with outer ring portion 9 are essentially at circumferentially-spaced positions which are slightly offset, angularly, in relation to the rigid integral connections of the outwardly-projecting end connections 18A, 18B and 18C, respectively, with the cell's central portion 8. Sensing-beams 16A, 16B and 16C lie along chords within angular spaces between sites of the end connections.

Gaging of the beams is shown for sensing in the shear mode, that is, for responses to surface strains exhibited by beams as they react to loading forces acting upon them in shear. Related practices are well known in the art, and the fine filaments of bonded electrical-resistance type gages used in such a mode are typically disposed at 45° in relation to the vertical; that is the condition illustrated in the case of cell 10, where the filaments of gages 22 on the radially outermore sides of the beams are in one herringbond pattern (FIG. 5) and their pattern on the gages 23 on the radially innermore sides of the beams is the opposite (FIG. 6). such gages have been exaggerated in dimensions and shaping, for purposes of convenience in the drawings, but they may in fact be exceedingly small, and/or may have only a single set of diagonal filaments or may be applied to only one surface of the beams, or may be of a wire or other type. Electrical connections with the gages, for powering and electrical sensing purposes, are conveniently brought through a connector accomodated by a side opening 24 (FIG. 2) in the outer portion of the cell. The load-receiving center portion 8 of the device does not extend fully to the level of the flat bottom surface of the outer "reaction" portion 9, because applied loads might then by-pass the measurement beams by being transmitted directly to whatever support underlies the cell; further, that spacing allows a conventional thin circular metal sealing diaphragm (not shown) to be introduced at that site. At the top, an annular thin metal diaphragm 25 (FIG. 2) is also welded or otherwise bonded securely in place over the intermediate annular sensing-beam region 10, to complete hermetic sealing of the cell.

Although three equally-spaced chordal beams have been illustrated, their number may be varied, and their elongation directions need not be strictly those of perfect chords. Geometry of such devices may also depart from circularity in other transducer applications where the sensing elements are to be elongated while the space they require is to be kept to a minimum. Capacities of cells of the same general outline may be varied to serve different loading ranges by arranging for appropriate different radial and/or axial thicknesses for the beams in the course of material removals by which the coaxial metal structure is fashioned. Accordingly, it should be understood that the specific embodiments and practices described in connection with this specification have been presented by way of disclosure rather than limitation, and that various modifications, combinations and substitutions may be effected by those skilled in the art without departure either in spirit or scope from this invention in its broader aspects and as set forth in the appended claims.

What I claim as new and desire to secure by Letters Patent of the United States is:

1. Strain gage transducer apparatus comprising a substantially rigid load-receiving portion of elastically-deformable material adapted to receive a load applied to it along an axis, said load-receiving portion being closely-spaced to a support portion, means for integrally interconnecting and maintaining said portions in closely-spaced relation in a first direction that is transverse to the axis along which the load is applied to said load-receiving portion, said means including stress-responsive, elongated sensing beam means having flat side surfaces whose elastic deformations characterize loading-induced shear stresses, said beam means being disposed substantially parallel to the axis along which the load is applied and transverse to the first direction, said means for integrally interconnecting and maintaining said load-receiving portion and said support portion further including large, adjacent spaced rigid end connections projecting from one of said portions toward the other and from said other to said one of said portions, respectively, said end connections being spaced apart laterally substantially transversely both to said axis and to the first direction, said sensing beam means being integral with and held at opposite ends by tapered ends of said adjacent rigid end connections, which tapered ends are opposite said load receiving portion and said support portion and, said beam means extending substantially transversely to said end connections across the lateral spacing between said end connections, and strain gage means fixed with said flat side surfaces of said beam means so as to be responsive to strain induced by loading transmitted between said load-receiving portion and said support portion through said end connections and said beam means.

2. Strain-gage transducer apparatus as set forth in claim 1 wherein said flat side surfaces of said beam means are separated from said load-receiving portion and said support portion, in the first direction, by contiguous spaces accommodating ready installation of said strain gage means on said surfaces by way of said spaces.

3. Strain-gage transducer apparatus as set forth in claim 1 wherein said beam means includes a plurality of stress-responsive elongated sensing beams each having flat side surfaces, wherein each of said beams is integral with and held at its opposite ends by said tapered ends of said end connections, and wherein said strain gage means are responsive to surface shear strain induced in said beams by said loading.

4. Strain-gage transducer apparatus as set forth in claim 3 wherein said load-receiving portion and said supporting portion are coaxial about the axis and are in said closely-spaced relation, wherein said beams are at least three in number and are symmetrically spaced substantially equi-angularly about the axis, each of said beams being elongated substantially in the direction of a chord of a circle about the axis.

5. Strain-gage transducer apparatus as set forth in claim 4 wherein radial spaces alongside said flat surfaces of said beams, between said beams and said load-receiving portion and said support portion, are substantially void and not occupied by said end connections, whereby to accommodate ready installation of said strain gage means on said surfaces by way of said spaces.

6. A load cell comprising substantially coaxial center and outer load-receiving and load-supporting portions constituting action and reaction members for loading applied substantially along an axis about which said portions are coaxial, said portions being radially separated by an annular region therebetween, a plurality of sensing beam elements having gage-mounting surfaces, said beam elements being disposed in said region at spaced angular positions about said axis each with a direction of elongation substantially transverse to said axis and to a radius from said axis, a plurality of end connections some of which project substantially radially outward from the center portion in said region and others of which project substantially radially inward from the outer portion in said region, opposite ends of each of said beam elements being fixed with and held by end connections which extend radially inward and outward, respectively, and strain gage means fixed with surfaces of said beam elements so as to be responsive to elastic deformations thereof induced by load transmitted between said center and outer portions.

7. A load cell as set forth in claim 6 wherein said gage-mounting surfaces of said beam elements are flat and extend axially and are radially separated from said center and outer portions by contiguous spaces accommodating ready installation of said strain gage means on said surfaces by way of said spaces, and wherein said portions and end connections and beam elements are integral and of the same elastically-deformable material, said portions and end connections being substantially rigid and said beam elements having relatively thin cross-sections which allow them to elastically deform sufficiently for said gages to characterize surface shear strain induced by load transmitted between said center and outer portions.

8. A load cell as set forth in claim 7 wherein said beam elements are at least three in number and are disposed in angularly-displaced relation to one another in a symmetrical array substantially equi-angularly about said axis, and wherein said end connections are disposed in said annular region at angular positions which lie substantially between said beam elements, said contiguous spaces being substantially void and not occupied by said end connections.

9. A load cell as set forth in claim 8 wherein said end connections are tapered in cross-section to blend and merge with said ends of said beam elements without significant discontinuity, and wherein said strain gage means includes bonded electrical-resistance strain gages whose filaments are inclined diagonally at substantially 45 degrees axially along at least some of said flat axially-extending surfaces so as to respond to and characterize said surface shear strain.

10. A load cell as set forth in claim 8 wherein said center portion has a substantially cylindrical exterior and said outer load-supporting portion is substantially annular and has a substantially cylindrical exterior and interior, wherein said direction of elongation of each of said beam elements is substantially along a chord referenced to the substantially circular interior of said outer portion, and wherein said end connections project radially inward from circumferentially spaced positions around said interior of said outer portion and project radially outward from circumferentially spaced positions around said exterior of said center portion.

11. A load cell as set forth in claim 10 wherein said end connections are tapered in cross-section to blend and merge with said ends of said beam elements without significant discontinuity, wherein there are an equal number of said end projections which extend inwardly and outwardly, and wherein separate pairs of said end connections lie angularly adjacent one another at said angular positions which lie between said beam elements, one of each of the pair of end connections extending inwardly and being connected to an end of one of said beam elements and the other of said pair of end connections extending outwardly and being connected to an end of another of said beam elements.

* * * * *